(12) United States Patent
Beck (10) Patent No.: US 8,917,825 B2
(45) Date of Patent: Dec. 23, 2014

(54) TELEPHONE-BASED COMMERCE SYSTEM

(75) Inventor: Philip D. Beck, Lido Beach, NY (US)

(73) Assignee: Planet Payment, Inc., Long Beach, NY (US)

(*) Notice: Subject to any disclaimer, the term of this patent is extended or adjusted under 35 U.S.C. 154(b) by 0 days.

(21) Appl. No.: 13/495,380

(22) Filed: Jun. 13, 2012

(65) Prior Publication Data

US 2012/0250839 A1  Oct. 4, 2012

Related U.S. Application Data

(63) Continuation of application No. 12/306,881, filed as application No. PCT/US2007/015306 on Jun. 27, 2007, now abandoned.

(60) Provisional application No. 60/817,293, filed on Jun. 28, 2006.

(51) Int. Cl.
*H04M 1/64* (2006.01)
*G06Q 30/06* (2012.01)
*G06Q 20/10* (2012.01)
*G06Q 40/00* (2012.01)
*G06Q 20/32* (2012.01)
*G06Q 20/38* (2012.01)
*G06Q 20/12* (2012.01)
*H04M 3/493* (2006.01)

(52) U.S. Cl.
CPC .............. *G06Q 20/12* (2013.01); *G06Q 30/06* (2013.01); *H04M 3/4938* (2013.01); *G06Q 20/102* (2013.01); *G06Q 40/00* (2013.01); *G06Q 20/322* (2013.01); *G06Q 20/32* (2013.01); *G06Q 30/0601* (2013.01); *G06Q 20/381* (2013.01); *G06Q 20/3272* (2013.01)
USPC ....................... 379/88.01; 379/88.18; 705/39

(58) Field of Classification Search
USPC ............ 705/26.1, 27.1, 64.75, 39; 379/88.01, 379/88.18
See application file for complete search history.

(56) References Cited

U.S. PATENT DOCUMENTS

| | | | | |
|---|---|---|---|---|
| 6,850,901 | B1* | 2/2005 | Hunter et al. | 705/26.35 |
| 2002/0120537 | A1* | 8/2002 | Morea et al. | 705/35 |
| 2005/0119971 | A1* | 6/2005 | Zito | 705/40 |
| 2005/0154664 | A1* | 7/2005 | Guy et al. | 705/35 |
| 2006/0224508 | A1* | 10/2006 | Fietz | 705/40 |
| 2009/0245539 | A1* | 10/2009 | Vaudrey et al. | 381/109 |

* cited by examiner

*Primary Examiner* — Simon King
(74) *Attorney, Agent, or Firm* — Abelman, Frayne & Schwab (57) ABSTRACT

A speech application implements a telephone-based commerce system and method which complements a core payment processing business and influences banks and other key partners to conduct such electronic business and commerce. The speech application includes a speech driven telephone interface for consumer shopping and order placement of commodity items; a consumer registration interface and secure process that ties in a credit card, debit card, or bank account; and a build-your-own-voice-store web application which includes a voice user interface with interactive voice response tailoring each voice store within the speech framework of the present invention and an inventory database. Multi-currency services, permitting pricing or payment in any chosen currency, as well as multiple spoken language processing of voice inputs are supported for performing voice commerce over telephones.

10 Claims, 7 Drawing Sheets

TELEPHONE-BASED COMMERCE SYSTEM

CROSS-REFERENCE TO RELATED APPLICATIONS

This application is a continuation of U.S. application Ser. No. 12/306,881, which is the national stage filing of PCT application No. PCT/US2007/015306, filed Jun. 27, 2007. Both such applications are incorporated herein by reference. This application claims priority on U.S. application No. 60/817,293, filed on Jun. 28, 2006, which is also incorporated herein by reference.

BACKGROUND OF THE INVENTION

This invention relates to telephone-based commerce, and in particular to a telephone-based system and method which facilitates voice-conducted commerce transactions over existing telephone networks.

Electronic-based commerce, also known as E-commerce, permits users to conduct business transactions and shopping with at least some electronic communications, either through computer text entry or through voice commands. For example, U.S. Pat. Nos. 6,341,264; 6,510,417; 6,581,035; 6,658,389; 6,807,574; and 6,636,590 describe systems which provide users with the capability of conducting voice commerce (V-commerce) by entering voice commands for conducting business transactions.

Other known systems provide users with electronic access to accounts, as described in U.S. Patent Application Publication Numbers US 2002/0116264 A1; US 2002/0119767; and US 2004/0147245 A1. Such known E-commerce and V-commerce systems have had limited applicability to provide an integrated and comprehensive system for facilitating consumer transactions.

Improvements in speech technology have led to the growth of the use of speech applications, particularly among large companies. Despite improvements in speech application standards and development tools, expectations to easily and affordably proliferate speech applications are as yet unfulfilled. Fortune 500 organizations have moved over the past year to new web based telephony platforms and speech enabled traditional Interactive Voice Response (IVR) applications in an effort to improve service. Automated speech applications that provide for a Return on Investment (ROI) through reduced personnel costs are emerging. Companies now have a choice of roll-your-own systems, hosted systems, or some combination from any number of known vendors in the marketplace.

Small and medium business (SMB) organizations have yet to significantly deploy speech applications. SMBs lack the resources to design a speech application and its interface, to record professional voice talents, and to monitor and tune a voice system. To address high upfront costs, vendors such as Angel, Apptera, Datria, Fluency, Harborlight and Metaphor Solutions offer pre-packaged generic applications that can be tailored. Secondly, free voiceXML starter platforms and online toolkits are available from Tellme, Be Vocal and Voxeo, and other free toolkits from "IBM CORPORATION" can be utilized at little or no cost. Thirdly, IBM has donated Reusable Dialogue Components to the public for a Java-based environment. These components perform functions and dynamically generate VoiceXML code when they run.

Numerous vendors are used by large companies that offer voice platforms which include standards, such as VoiceXML, and/or speech engines to implement speech applications.

Additionally, major vendors are active in this field whose strength in the market is as middleware providers, such as "MICROSOFT CORPORATION" and "IBM CORPORATION". Some vendors are speech specialists which include support for standards including VoiceXML. Vendors such as Nuance, Loquendo, Telisma and upcoming competitors from countries such as China and others focus on the speech engines.

Vendors such as TuVox that come to market with strengths in hosted and managed solutions are used by large and smaller companies. In some cases, these are hybrid premise-service offerings built on VoiceXML and IP networks. Vendors offering this type of solution include carriers such as AT&T or MCI, contact center outsourcers such as Convergys or West Corporation, and voice response services such as Tellme Networks.

However, despite such developments in IVR, the reality of linking payment cards, such as credit cards, debit cards, and/or pre-paid cards to cell phones has not been substantially or fully realized in the United States. A number of banking and financial institutions are testing the idea and hope to roll out similar products in the future, such as operating with the "PAYPAL" payment system commercially available from "EBAY, INC.", as well as Obopay, Textpayme, and Mobilelime. In addition, radio frequency identification (RFID) wireless projects that use the phone as a card, such as EZpass, are driven by banks and credit card companies.

U.S. trials are in place, such as one which allows existing customers of "JPMORGAN CHASE & COMPANY" to pay at Philips Arena in Atlanta via a telephone device with an embedded chip. Most cell phones do not include the Near-Field Communication (NFC) chip, but cell phone manufacturers are moving towards this capability and it is expected that half of all phones will have the NFC chip by 2010.

There are numerous deployed text based mobile payment applications outside of the United States, in addition to a number of mobile phone solutions with integrated swipe capability which have been available and appear to be moving towards additional non-swipe solutions.

Another area related to mobile speech is multi-modal applications which more closely tie the phone's speech and visual processing. Multi-modal capability has the potential for implementation, but not fully for the next few years because of network constraints which are better addressed in 3G mobile networks, to which the United States is now moving. Also, a majority of phones are not capable of supporting two simultaneous channels, with just one for speech and one for visuals.

However, the existing systems fail to provide a speech application that complements a core payment processing business and influences banks and other key partners to conduct such electronic business and commerce.

In addition, known E-commerce systems such as Internet and web-based commercial applications are typically visually based, and so are disadvantageous for people with limited or no sight. Besides such users who have limited or no sight, other potential users such as young people, sometimes referred to as "Gen-Yers", routinely use telephones, and in particular cell phones as opposed to using personal computers (PC) and PC-based Internet browsers. Furthermore, potential users such as the relatively old or relatively poor may lack the ability, familiarity, comfort level, and financial resources to use traditional computer-based E-commerce, and cannot conduct E-commerce based on such visual as well as tactile operations of prior art computers, for example, using the mouse and browsers interacting with E-commerce websites on the Internet. Such Gen-Yers, older users, and relatively poor users may be more readily familiar with and comfortable with using telephones, and so such users would more readily use telephone-based systems to successfully conduct commerce through voice commands.

An integrated V-commerce system with automated payment methods would be advantageous to facilitate commercial activities by groups of people having a greater affinity to using telephones than using PC-based E-commerce facilities, such as people with limited or no sight, and young people including Gen-Yers, as well as the elderly and the poor.

SUMMARY OF THE INVENTION

A speech application implements a telephone-based commerce system and method which complements a core payment processing business and influences banks and other key partners to conduct such electronic business and commerce. The speech application includes
a speech driven telephone interface for consumer shopping and order placement of commodity items; a consumer registration interface and secure process that ties in a credit card, debit card, or bank account; and a build-your-own-voice-store web application which includes a voice user interface with interactive voice response (IVR) tailoring each voice store within the speech framework of the present invention and an inventory database. Multi-currency services, permitting payment or pricing in any chosen currency, as well as multiple spoken language processing of voice inputs, are supported for performing voice commerce over telephones.

BRIEF DESCRIPTION OF THE DRAWINGS

Preferred embodiments of the invention are disclosed hereinbelow with reference to the drawings.

DETAILED DESCRIPTION OF THE INVENTION

As shown in FIGS. 1-6, a system 10 of the present invention is provided for implementing a telephone-based commerce system 12 and method with a telephone-based speech driven shopping capability enabled by a "build your own voice store" application which can accomplish the goals of telephone-based commerce described herein.

In operation, the system 10 and method provide a telephone-based commerce solution capable of supporting mobile commerce by consumers and businesses, for facilitating and conducting V-commerce, whether during travel or at home, and for providing an automated framework for establishing a voice store presence, such as a voice storefront or a media campaign, with an interactive 24/7/365 sales channel which is effectively always open.

In addition to improving and enhancing known methods of conducting V-commerce, the system 10 and method of the present invention are capable of capturing impulse buyers with mobile shopping and payment services, including simple purchases through the customer's speaking a product code to effect a purchase, through automated payment processors, and through multi-currency conversion for electronic payments accessing different currencies, as well as with multiple spoken language support and processing for any caller located anywhere globally and connected to and communicating with the system 10 and method by telephone.

For example, a user can see a product code associated with a product, such as a displayed product seen through a window in a retail establishment, even if the store is closed, or an image of a product in magazine with the product code sufficiently visible and associated with the product. The user then uses the system 10 and method of the present invention to conduct V-commerce, for example, to learn more information about the product, its price, dimensions, available colors and sizes, whether the product is in stock, a list of retail stores in different geographic locations which carry the product, etc. Such additional product information is conveyed to the user from a voice store accessed by the system 10 and method, for example, using pre-recorded or computer-generated audio signals transmitted directly to the user's telephone. Upon receiving appropriate user commands, such as voice commands or touch tones, the caller can complete a purchase of the product entirely by telephone, as described herein. All of these services can be conducted in the language of the user's choosing, and purchases can be priced or paid for in a currency of the user's choice, or at the retail store's choosing, the purchase can be priced or paid for in the currency in which the merchant typically sells its goods or services.

Based on the use of voice telephony in which voice messages and communications through the speaker and microphone of a telephone device and/or touch tone inputs through a telephone keypad of a telephone device are the primary method of user inputs, the system 10 and method of the present invention provide a fully managed and hosted solution to power quick, simple, and fully secure shopping anywhere and anytime through the ubiquitous present of telephone capabilities at least through voice inputs and commands.

As used herein, the term "voice" is defined to include spoken language inputs, voice recognition techniques, touch tone inputs, and any known devices and methods for using a telephone device for inputting user selections and user data.

The system 10 and method allow users such as consumers to access vendors, services, databases, commercial websites, and other commerce-based entities from any mobile and/or land-line telephone. The system 10 and method may provide a friendly, personalized natural-voice interface, using customizable voice menus, which engages shoppers in a "live" shopping process. In addition, known verification systems and methods, such as biometric and/or voiceprint authentication, protect such telephone-based consumers against identify theft and fraud, with assured privacy.

The system 10 and method also provide integrated payment processing which is expedited with customer-registration information safely stored on a global processing platform. The system 10 and method can also implement online reports and data analytics using computer-based systems, methods, and techniques known in the art, for summarizing call details and customer transaction histories, and for determining ROI statistics and customer knowledge, as well as customer demographics and indications of buying trends, to facilitate driving a more targeted advertising campaign and store-card and loyalty programs with consumers, for enhancing customer loyalty and for driving repeat purchases.

Through the implementation of the telephone-speech driven shopping capability enabled by the "build your own voice store" application, small businesses and organizations can readily jumpstart a marketing or service campaign and highlight featured products and services on web hosting services using the system 10 and method of the present invention with little or no investment or need for additional infrastructure, which can quickly and simply be deployed with no long-term commitment for retail space or contractual business arrangements. Web hosting services such as V-commerce storefronts and online advertisements can be leveraged using modular merchant voice-based online store services to create a branded, voice shopping experience that establishes and/or complements existing distribution channels.

In addition, existing fulfillment databases for established V-commerce and E-commerce channels may use a common extensible mark-up language (XML) interface for allowing automated retail processing of voice-based orders, in which XML processors extract the necessary data, such as the purchaser's name, address, and method of payment from inputted data fields to complete and fulfill the voice-entered order. Such inputted data fields of each order are populated by voice commands from a purchasing user employing the system 10 and method of the present invention.

In addition, the system 10 and method of the present invention, which is entirely automated to provide telephone-based V-commerce, can be attractive to the next generation of shoppers, such as Gen-Yers who are devoted to predominantly conducting commercial interactions or to being singularly limited to commercial interactions through E-commerce. In addition, users who have limited or no sight, and/or are relatively old or relatively poor, and thus lacking the ability, familiarity, comfort level, and financial resources to use traditional computer-based E-commerce, cannot conduct E-commerce based on such visual as well as tactile operations of prior art computers, for example, using the mouse and browsers interacting with E-commerce websites on the Internet. Such Gen-Yers, older users, and relatively poor users may be more readily familiar with and comfortable with using telephones, and so such users can readily use the system 10 and method of the present invention to successfully conduct commerce through voice commands.

Optional pre-registration of a user to the system 10 and method facilitates personalized voice-based shopping anywhere using user-preferred payment choices and shipping information. In addition, the system 10 and method support multiple spoken language processing and multi-currency services such that both domestic and international consumers can hear and audibly browse product information, and merchants may allow users to shop for products and services in their preferred language and with the ease of using their preferred currency.

Figure 1:
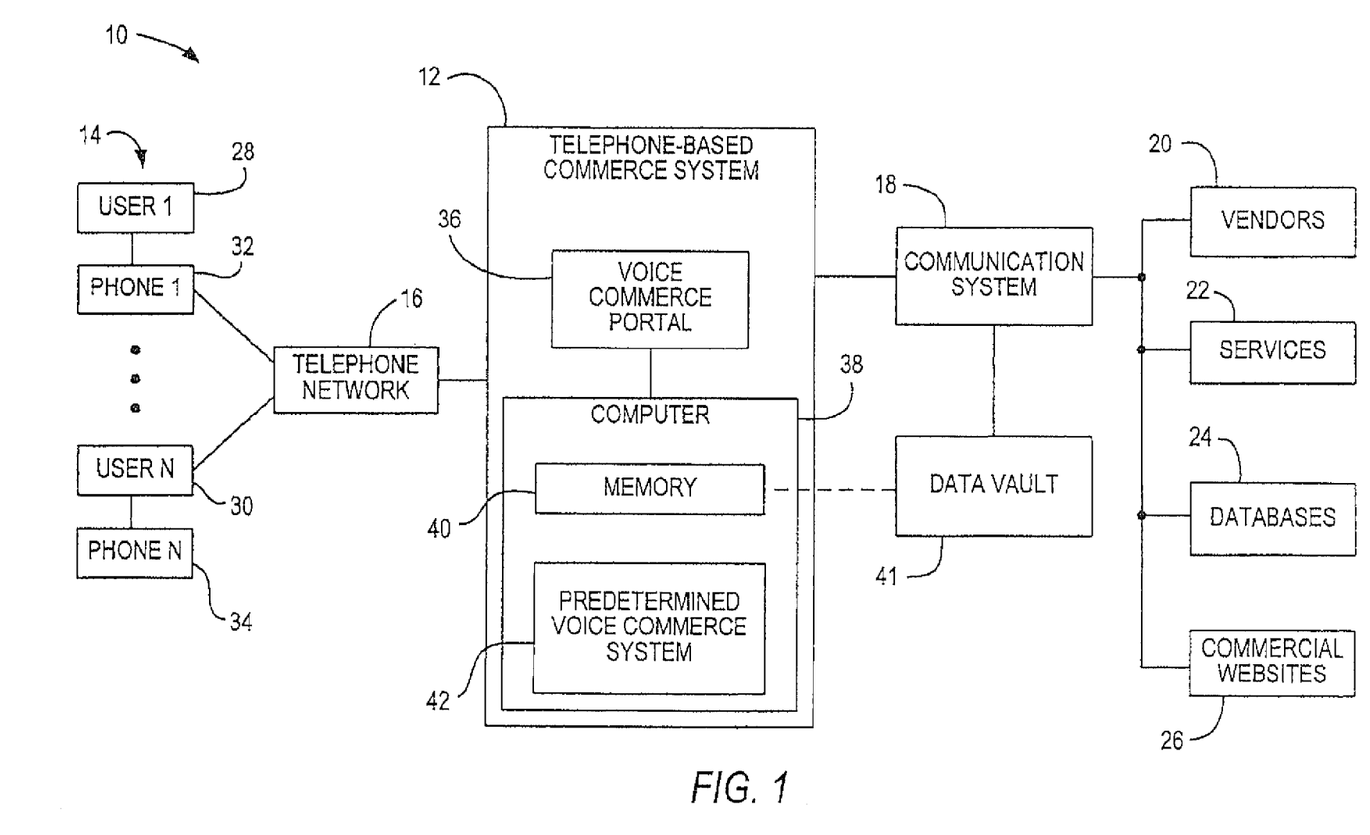
FIG. 1 is a schematic of the telephone-based commerce system of the present invention.

Referring to FIG. 1, the system 10 includes the telephone-based commerce system 12 connected to and accessed by a plurality 14 of users by a telephone network 16 which provides communication connections to various users over any known type of telephone. Based on the inputs from any one of the plurality 14 of users, the telephone-based commerce system 12 performs voice commerce operations through a communication system 18 to interact with commercial entities, such as, but not limited to, vendors 20, services 22, databases 24, commercial websites 26, and/or any other known facility or organization to conduct voice-based commerce with one or more of the plurality 14 of the users.

The communication system 18 may include the Internet, the telephone network 16, satellite and/or terrestrial communication techniques, any other known systems for communications, or combinations thereof for facilitating the voice-based commerce between one or more of the plurality 14 of the users and their selected commercial entities 20-26.

Each of the users 28, 30 of the plurality 14 of users is associated with and/or has access to a respective telephone device 32, 34 for interacting with the telephone network 16. For example, the telephone network 16 may be a traditional telephone system such as a plain old telephone system (POTS), a publicly switched telephone network (PSTN), a private branch exchange (PBX) system, and/or any other known telephone systems. The telephone devices 32, 34 may be any one or a combination of a cellular telephone, a landline telephone, a personal digital assistant (PDA), a pager, a "BLACKBERRY" communication device commercially available from "RESEARCH IN MOTION LTD.", an "IPHONE" telephone device commercially available from "APPLE COMPUTER", a laptop computer or a personal computer with a modem for converting digital signals and data to telephone-based signals, a device capable of conducting Voice over Internet Protocol (VOIP) communications, a wireless device capable of telephone communications, and/or any other known devices for conducting telephone communications through the telephone network 16. For example, a first user 28 may use a cell phone as the telephone device 32, while another user 30 may use a laptop computer with modem capability as the telephone device 34.

Referring to FIG. 1, the telephone-based commerce system 12 includes a voice commerce portal 36 connected to a computer 38 which includes a memory 40 for saving user information such as personal data including the user's name, date of birth, marital status, etc. as well as payment data such as bank account data, credit card data, or debit card data, and also types of accounts such as Person-to-Person payment modalities similar to PAYPAL, checking, savings, debit account status, etc. The personal data and/or the payment data may also including a billing address, a shipping address, and other shipping information for receiving purchases and services, such as a preferred method of delivery, including priority mail, specific couriers, or standard freight.

The memory 40 is also capable of storing pre-programmed operational settings, as well as the operating system and other software and communication interface applications. The memory 40 may include a vault of user information and/or the memory 40 may be connected to a separate data vault 41, for example, by secure connection through the communication system 18, for receiving user preferences and selections from the user and/or from the data vault 41. Alternatively, the data vault 41 may be incorporated into or connected to at least one of the databases 24. The data vault 41 may be remotely located relative to the telephone-based commerce system 12, for example, to prevent hacking, data theft, or data corruption. The use of a data vault avoids having to store the user information on a mobile device, thereby avoiding the security issues that might arise if the phone is lost, stolen or damaged.

A user may directly access the data vault 41 through the communication system 18, for example, through a personal computer or other known input devices accessing the Internet as the communication system 18 for entering and modifying user-related data stored in the data vault 41. Alternatively, the user may directly access the data vault 41 through a telephone 32, 34 using a telephone network as the communication system 18, and either with or without the telephone-based commerce system 12 mediating the communications between the user and the data vault 41 to enter and modify user-related data stored in the data vault 41. Accordingly, the user can enter data about the user, including setting corresponding user preferences and selections, such as the personal data and payment data described herein, for facilitating the user's voice-based transactions with the entities 20-26 through the telephone-based commerce system 12.

By using the memory 40 and/or the data vault 41, each particular user may specify user-specific settings with which the user prefers to conduct V-commerce through the telephone-based commerce system 12. For example, the user information may include the user's name, a password for using the telephone-based commerce system 12, and payment information such as credit or debit card data, shipping or fulfillment information, as well as a preferred or default spoken language, such as English or Spanish, which the particular user prefers to hear and speak to use the telephone-based commerce system 12, and also a preferred or default currency, such as the U.S. dollar or the Euro, in which the particular user prefers to transact V-commerce. Such user information in the memory 40 and/or the data vault 41 may be selected and customized at any time by the user using systems and methods known in the art, such as voice menus and/or touch tone entries which, for example, a first user 28 accesses through the telephone device 32.

The computer 38 also includes a predetermined voice commerce system 42 described in greater detail herein. The voice commerce portal 36 receives telephonic communications from the users 28, 30 through the telephone network 16, described in connection with FIG. 2, and the computer 38 processes such telephone communications using the predetermined voice commerce system 42, described in connection with FIG. 3, to facilitate the voice commerce with the commercial entities 20-26.

Figure 2:
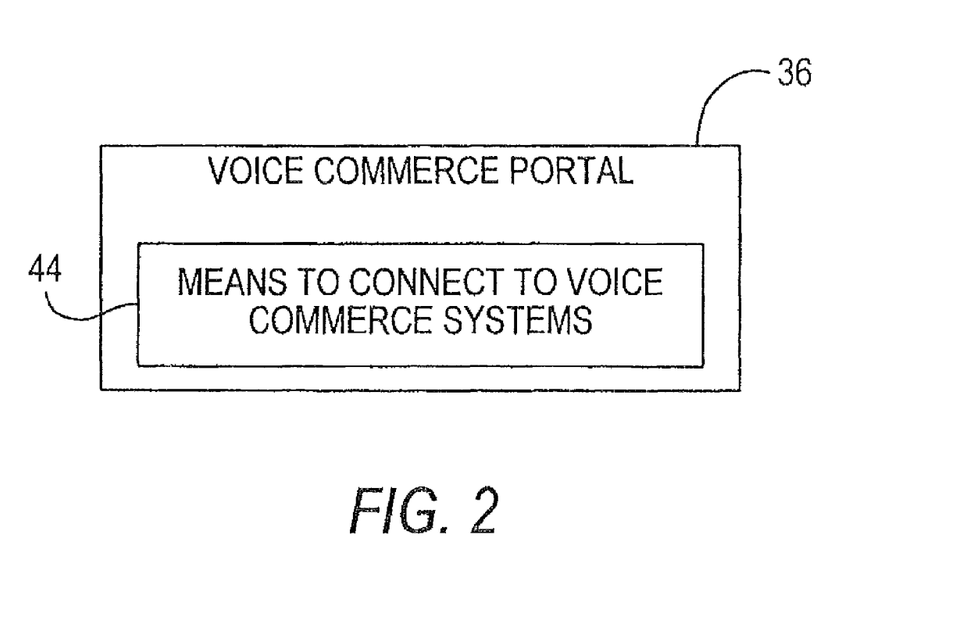
FIG. 2 is a schematic of a voice commerce portal used by the present invention.

Referring to FIG. 2, the voice commerce portal 36 includes means 44 through which a caller; for example, the first user 28, can connect to any one of a variety of voice commerce systems, such as the commercial entities 20-26, implementing the method described herein upon being prompted to select a particular voice commerce system after calling the voice commerce portal 36. In one embodiment, the connection means 44 may include a user-selectable voice menu system known in the art which generates and outputs audio and/or visual prompts to the respective telephones 32, 34 of the users 28, 30 to select a particular voice commerce system after calling the voice commerce portal 36. For example, a selectable voice commerce system may include a selectable spoken language processing capability to interact with the user through voice commands in a selected spoken language of the user.

Alternatively, the connection means 44 may include a programmable telephone switch known in the art with one or more dedicated voice commerce telephone numbers, such that telephone calls from the plurality 14 of users to such voice commerce telephone numbers are automatically switched to the computer 38 for voice commerce processing, as described herein. Accordingly, telephone calls to the telephone-based commerce system 12 which are not to the dedicated voice commerce telephone numbers may be for routine administrative or service inquiries not associated with voice commerce, and so the connection means 44 recognizes that such telephone calls do not involve voice commerce and the telephone calls are switched to another entity, such as an administrator, instead of being directed to the telephone-based commerce system 12 for conducting voice commerce.

In addition, the users 28, 30 can interact with the telephone-based commerce system 12 through the voice commerce portal 36 using touch tones entered by a respective user through a touch tone keypad of the telephones 32, 34.

Figure 3A:
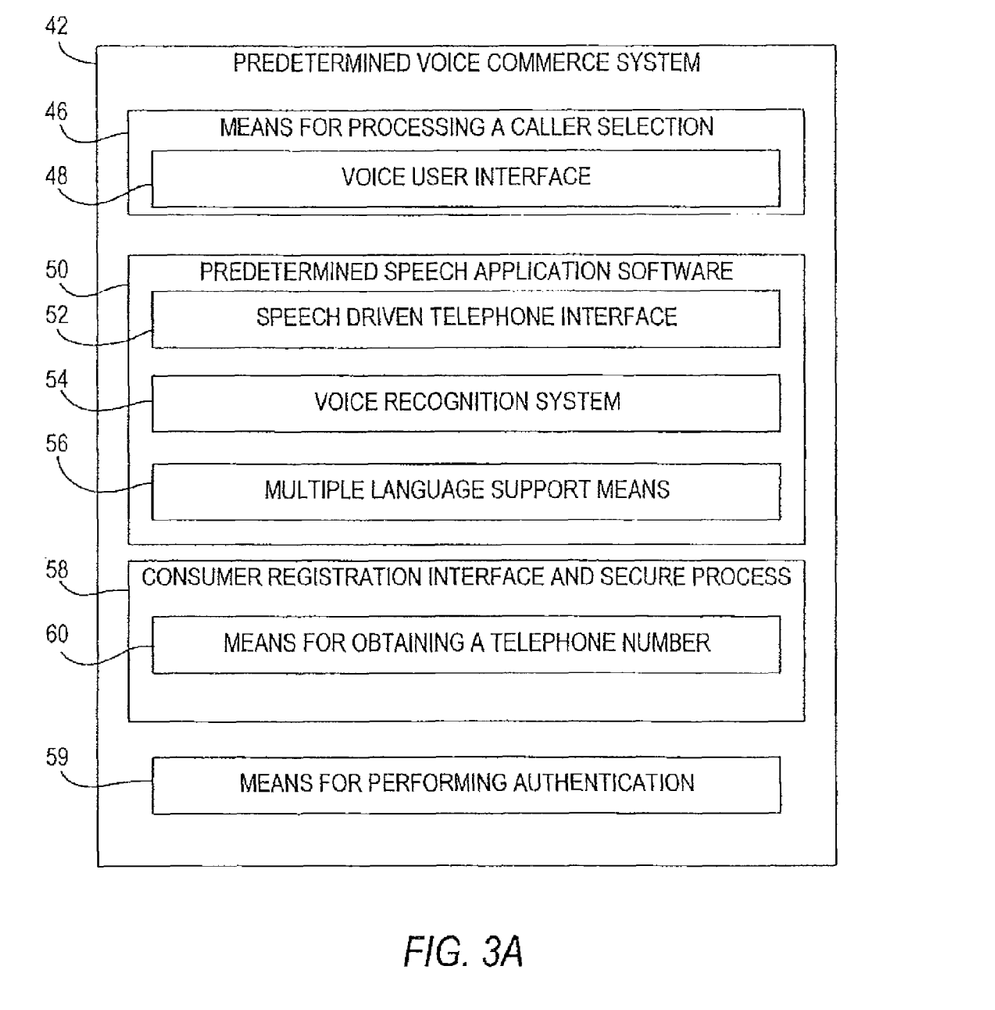
FIGS. 3A-3B are schematics of a voice commerce system used by the present invention.
Figure 3B:
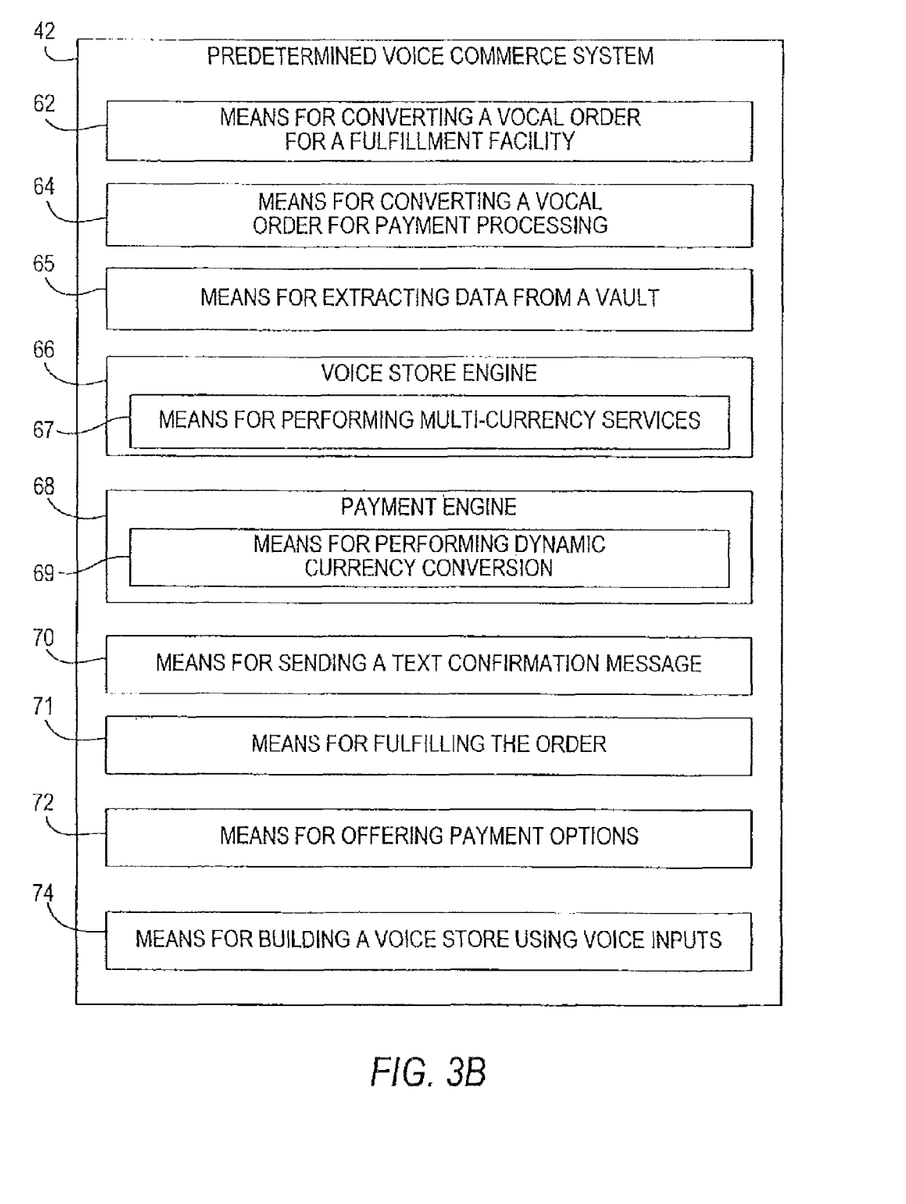

Referring to FIGS. 3A-3B, the predetermined voice commerce system 42 shown in FIG. 1 includes a plurality of components and means, implemented in hardware and/or software, for operating the telephone-based commerce system 12 as described herein.

The predetermined voice commerce system 42 may be an integrated system of components or a stand-alone software application written in any known programming language; for example, written in C++ or "C#" available from "MICROSOFT CORPORATION".

The predetermined voice commerce system 42 is controlled and/or executed by a processor or server of the computer 38. In an example embodiment, the computer 38 includes a any known server such as a server commercially available from "ORACLE CORPORATION", and/or other systems commercially available from "SUN MICROSYSTEMS INC.", "MICROSOFT CORPORATION", or "SAP AG". The computer 38 operates the hardware and/or software components described herein using any known operating system such as the "WINDOWS XP" or "WINDOWS VISTA" operating systems commercially available from "MICROSOFT CORPORATION".

As shown in FIG. 3A, the predetermined voice commerce system includes means 46 for processing a caller selection with a voice user interface (VUI) 48, for example, using voice-activated menus through the telephones 32, 34. As described herein, the processing means 46 offers the caller the option of paying for the goods or services using a payment engine through which the caller has previously enrolled so that the caller can pay for the goods or services simply by stating that the caller has enrolled in the payment processing program and by providing its pre-arranged payment security verification. The processing means 46 also processes caller selections, such as the case if the caller declines to use or has not enrolled in the payment processing program, and offers the caller the option of paying for the goods or services orally by providing a credit card or debit card number and appropriate verification, such as the customer identification numbers for payment cards, such as for credit cards, debit cards, and pre-paid cards, or other known verification systems and methods, such as biometric and/or voiceprint authentication.

The predetermined voice commerce system 42 also includes predetermined speech application software 50 providing a speech driven telephone interface 52, a voice recognition system 54, and multiple language support means 56 for allowing the users 28, 30 to operate the telephone-based commerce system 12 in any one of a plurality of supported spoken languages, such as English, Spanish, French, German, Chinese, Russian, Arabic, etc.

The speech driven telephone interface 52 facilitates consumer shopping and order placement of commodity items or services from the entities 20-26 by processing voice-selected menu selections, for example, from the caller's use of the voice user interface 48, to generate signals corresponding to the menu selections. The voice recognition system 54 is used so that when a caller calls a specific telephone number to inquire about the goods or services being offered through the telephone-based commerce system 12, the caller can: (i) browse by voice command through a description of the goods and services being offered and their prices or (ii) locate the description and price of a specific good or service being sought by the caller using a product code entered by voice and/or by touch tone, and (iii) conduct the entire transaction, including the purchase of and payment for the goods and services, through spoken words using ordinary language, which may be any supported language handled by the multiple language support means 56, and which may be conducted in any supported or preferred currency by the multi-currency services means 67 and/or the dynamic currency conversion means 69.

The predetermined voice commerce system 42 also includes a consumer registration interface and secure process system 58 for receiving user information using registration menus and security systems known in the art, such as passwords and verification procedures, with such user information and passwords to be stored in the memory 40 and/or a data vault 41 separate from the voice stores provided by the telephone-based commerce system 10.

In addition, the predetermined voice commerce system 42 also includes means 59 for authenticating the user by any known authenticating techniques, such as prompting entry of a valid personal identification number (PIN), speaking one's mother's maiden name, answering a question whose answer was provided previously by the user and stored, etc. The authenticating means 59 may be incorporated into and/or may operate in conjunction with the consumer registration interface and secure process system 58.

The consumer registration interface and secure process system 58 permits the telephone-based commerce system 12 to securely tie in and interact with a payment account such as a credit card, debit card, or bank account of the user. Accordingly, the system 10 and method of the present invention solves the problem encountered in the prior art, in which sensitive information is potentially transmitted repeatedly in order to conduct multiple transactions, with such information being typically transmitted digitally over communication channels and so easier to intercept by digital data capture. The present invention is advantageous in using voice commands which, if intercepted, require additional voice processing in order to extract the user's information, preferences, and secure data such as passwords.

The predetermined voice commerce system 42 also includes means 60 for allowing a user to obtain a telephone number through any known means, such as magazine ads, billboards, Internet-based banner advertisements, mail including E-mail, etc., which allow the user to access the system 10 and method through any known telephonic means, including wired telephone lines, cell phones, VOIP, etc., for the promotion of the sale of a single item or limited number of items of a product or service, and which could potentially be time sensitive such as tickets to a show, a concert, a sporting event, etc.

The predetermined voice commerce system 42 also includes means 62 for converting a vocal order for a fulfillment facility to process, in which the converting means 62 responds to authorization of payment by the payment processor for converting the caller's vocal order to purchase goods and services to digital format and transmitting the digitally formatted order to a fulfillment facility. Such converting means 62 may be any known system and method for converting a vocal order for a fulfillment facility, such as forwarding the order information via SMS, email or a Web Services call.

Referring to FIG. 3B, the predetermined voice commerce system 42 also includes means 64 for converting a vocal order for payment processing by a payment engine or other known devices and systems, which may be integrated internally in the predetermined voice commerce system 42 as a payment engine 68 and/or which may be externally available through any one of the vendors 20, services 22, or commercial websites 26 connected to the telephone-based commerce system 12 through the communication system 18. For example, the caller may set the payment system commercially available as "PAYPAL" provided by "EBAY INC." as the caller's default payment system stored in the memory 40 and/or the data vault 41. Thus, the caller's vocal order to purchase goods and services is converted to digital format and transmitted as digitally formatted payment information sent to a payment processor for completion of the payment of the order implemented by voice commerce using the present invention.

For processing and completing transactions, the predetermined voice commerce system 42 includes means 65 for extracting data from a vault, such as the data vault 41, in which the data may include the purchaser name and a preferred or default payment card type, such as a credit card, debit card, or pre-paid card selected by the purchaser for completing the purchaser's transactions. The extracted data may also include the corresponding payment card identification information, such as a credit card number, an expiration date of the credit card, a billing address, and a shipping address for the delivery of purchased goods or services.

A voice store engine 66 is provided for establishing, maintaining, and interacting with a voice store, for example, as a website stored externally in one or more databases 24 and accessible by the users 28, 30 through the communication system 18. The voice store includes a stored inventory table listing items available for purchase by the users 28, 30.

As shown in FIG. 3B, the voice store engine 66 may include means 67 for multi-currency services, in which the preferred currency of the user is used, with the preferred currency stored in and retrieved from the memory 40 in the telephone-based commerce system 12 at the time of the sale or transaction and/or from an appropriate database 24 associated with the merchant or the merchant's voice store. For example, a user in London engaged in a sale may prefer to conduct the sale in U.S. dollars or Japanese yen, instead of the British pound or the Euro, by payment cards, such as by credit card, debit card, or pre-paid card. Therefore, the means 67 for multi-currency services of the telephone-based commerce system 12 facilitates the pricing and sale in the user's choice of currency.

Such multi-currency conversion and processing by the multi-currency conversion means 67 may be performed using any known type of multi-currency system, such as local currency rate tables or price points stored, for example, in the memory 40 and/or the data vault 41, or available from other sources, such as any of the entities 20-26 such as specialized currency databases in the databases 24. In addition, data files including rate feeds may be readily and/or regularly transmitted, for example, by a service 22, with little data overhead and easy data extraction, for example, in the form of text-based XML data files, which the multi-currency services means 67 can easily process to extract up-to-date currency conversion rates.

As shown in FIG. 3B, the predetermined voice commerce system also uses the registration interface 58 through which users can pre-enroll by providing pertinent personal data, and payment data such as credit card data or debit card data, and by establishing a pre-arranged payment security verification such as a personal identification number, an identifying word or password, answers to pre-selected questions, and/or voice print recognition. Additional information can be entered by the users and stored in the memory 40 and/or the data vault 41 during the pre-enrollment process, such as personal data including the user's name, date of birth, marital status, etc. as well as payment data such as bank account data, credit card data, or debit card data, and also types of accounts such as checking, savings, debit account status, etc. The personal data and/or the payment data may also including a billing address, a shipping address, and other shipping information for receiving purchases and services such as a preferred method of delivery, including priority mail, specific couriers, or standard freight.

In addition, the payment engine 68 may also include means 69 for dynamic currency conversion, to provide a foreign currency conversion service such as "TIME-OF-SALE DYNAMIC CURRENCY CONVERSION" commercially available from "PLANET PAYMENT, INC.". Such dynamic currency conversion performed at the time of sale by the dynamic currency conversion means 69 is also described in U.S. application Ser. No. 10/704,342, filed Nov. 7, 2003; which has been published as U.S. Patent Application Publication Number US 2004/0148255 A1, published on Jul. 29, 2004, which is incorporated herein by reference in its entirety.

Using dynamic currency conversion, any of the plurality 14 of users using the system 10 of the present invention may conduct voice commerce in which such users, including internationally located consumers, are provided the option to have transactions by payment cards, such as by credit card, debit card, or pre-paid card, converted in real time at the point of sale (POS) from the currency in which the merchant or vendor 20, and/or the other entities 22-26 offers its goods into the currency in which the caller's credit card, debit card, or pre-paid card is billed while the merchant still conducts business in its local currency. The dynamic currency conversion performed by the dynamic currency conversion means 69 provides pricing transparency and clarity at the POS, allowing customers to make more informed purchasing decisions at the time of purchase or of conducting the voice commerce.

The multi-currency services means 67 and/or the dynamic currency conversion means 69 may be implemented as a product suite on either a fully outsourced basis by the telephone-based commerce system 12 through the communication system 18, or on an integrated basis within the telephone-based commerce system 12, and provided to customers such as the plurality 14 of users performing voice commerce using the telephone-based commerce system 12 of the present invention, as well as to vendors 20 and to acquiring banks around the world including payment processors such as the payment engine 68 and/or the entities 20-26, and may be delivered through the existing POS infrastructure. All transaction activity performed by the multi-currency services means 67 and/or the dynamic currency conversion means 69 may be routed through a robust global transaction engine integrated into or in communication with the telephone-based commerce system 12, which allows the multi-currency services means 67 and/or the dynamic currency conversion means 69 to provide customers, acquirers, and their internationally focused merchants with consolidated and precise transaction-level reporting and reconciliation that was unavailable previously in known V-commerce systems.

As the transactions are processed and completed, the predetermined voice commerce system 42 may provide transaction confirmation messages to purchasers using means 70 for sending a text confirmation message. The confirmation message may be a short message service (SMS) communication to a respective telephone device 32, 34 of the purchaser, an E-mail message through the Internet as the communication system 18 to an E-mail retrieval device of the purchaser such as a computer or PDA, or any other known method of sending a confirmation message to the purchaser.

The predetermined voice commerce system 42 also includes means 71 for fulfilling the order for the goods or services, for example, for communicating through the communication system 18 to the appropriate entities 20-26 for performing such fulfillment. Such fulfilling means 71 may be any known system and method for fulfilling an order.

The predetermined voice commerce system 42 also includes means 72 for offering payment options, such as offering the caller the option of paying for the goods or services using the payment engine 68 through which the caller has previously enrolled so that the caller can pay for the goods or services simply by stating that the caller has enrolled in the payment processing program and by providing its pre-arranged payment security verification. The offering means 72 also processes a caller selection if the caller declines to use or has not enrolled in the payment processing program, and offers the caller the option of paying for the goods or services orally by providing a credit card or debit card number and appropriate verification, such as the customer identification numbers for payment cards, such as credit cards, debit cards, or pre-paid cards.

In addition, other types of authentication may be performed by the offering means 72, such as using zip codes or numerical credit card authentication data, such as a card security code (CSC), alternatively referred to as a card verification code (CVC), a card verification value (CVV), or a card identification number (CID). Such data may be spoken and/or typed by the user into the telephone of the user, for example, using touch tones.

Additional layers of authentication may be used, such as entry of a PIN, passwords, voice prints, etc., as well as data from the telephone number of the caller from which geographic location may be determined by techniques known in the art.

As described herein, the predetermined voice commerce system 42 also includes means 74 for building a voice store using voice inputs. The means 74 may be a web-based application, for example, "FRONTPAGE" commercially available from "MICROSOFT CORPORATION", which may be used with typed inputs and/or which is adapted to receive and respond to voice inputs or touch tones entered by the users 28, 30 over the telephone network 16, in addition to or instead of keyboard-entered, keypad-entered, and/or typed inputs, for constructing the voice store to support a voice commerce system customized by a user.

Figure 4A:
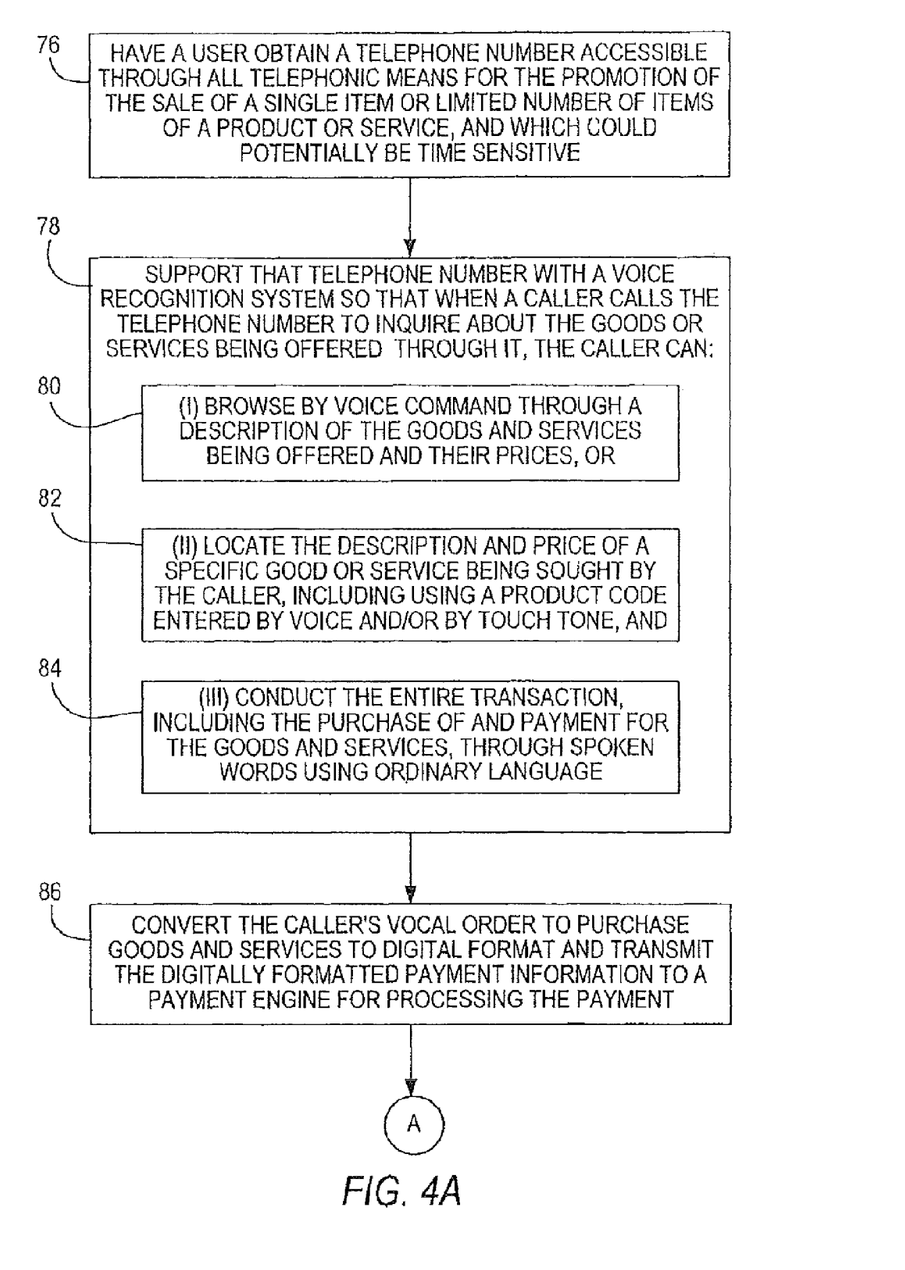
FIGS. 4A-4B are a flowchart of operation of the present invention.
Figure 4B:
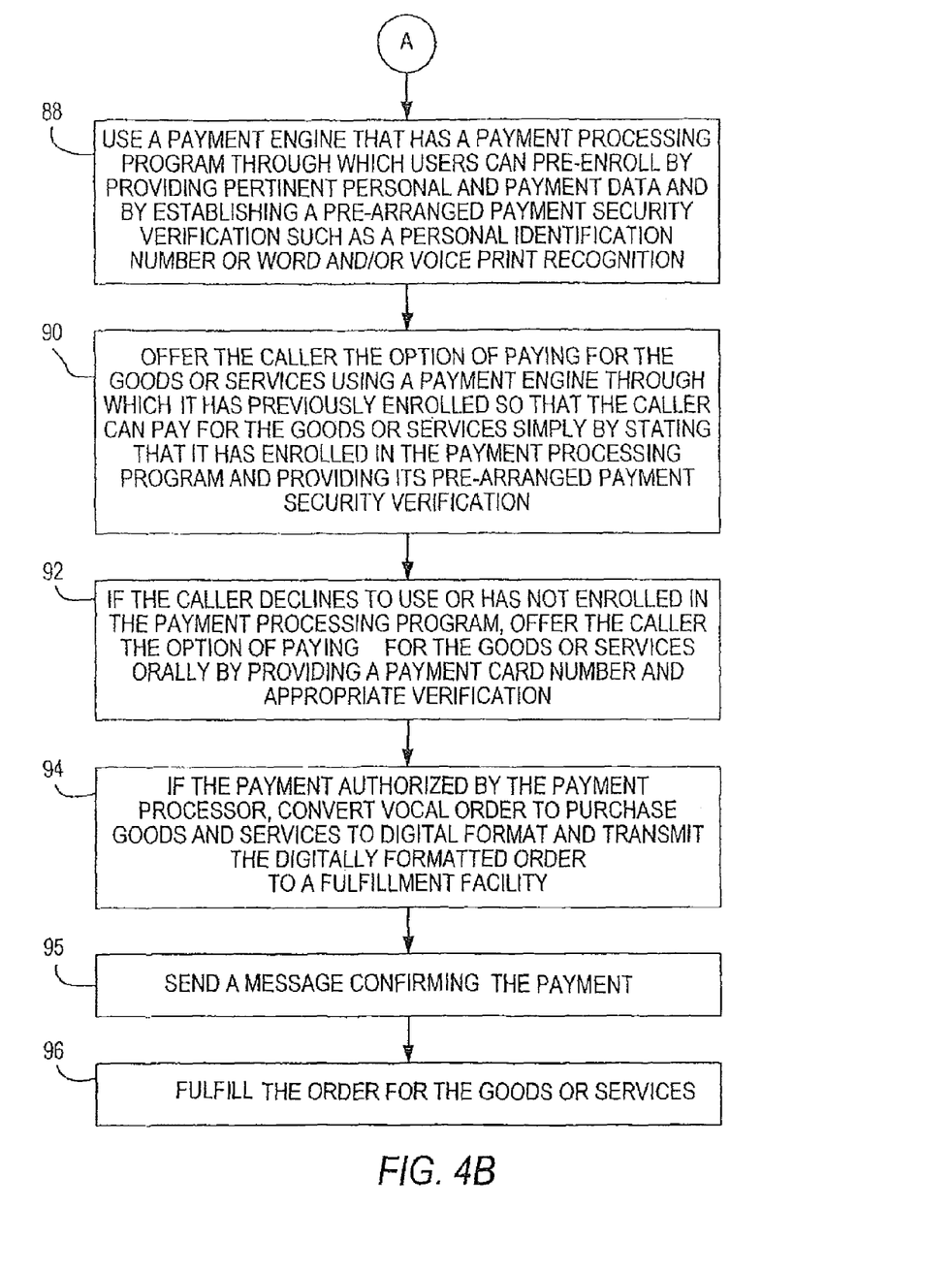

As shown in FIGS. 4A-4B, the telephone-based voice commerce method of the present invention performs, using the system of FIGS. 1-3B, the steps of:

having a user obtain a telephone number in step 76 accessible through any and all telephonic means, such as wired telephone lines, cell phones, VOIP, etc., facilitated by the telephone network 16 for the promotion of the sale of a single item or limited number of items of a product or service, and which could potentially be time sensitive such as tickets to a show, a concert, a sporting event, etc.;

supporting that telephone number in step 78 with a voice recognition system 54 so that when a caller calls the telephone number to inquire about the goods or services being offered through it, the caller can: (i) browse by voice command in step 80 through a description of the goods and services being offered and their prices or (ii) locate the description and price of a specific good or service being sought by the caller in step 82 using a product code entered by voice and/or by touch tone, and (iii) conduct the entire transaction, including the purchase of and payment for the goods and services, through spoken words using ordinary language in step 84;

converting the caller's vocal order to purchase goods and services to digital format in step 86 and transmitting the digitally formatted payment information to a payment processor, such as the payment engine 68, for the processing of the payment;

using the payment engine in step 88 that has a payment processing program through which users can pre-enroll by providing pertinent personal and payment data, such as credit card data, and by establishing a pre-arranged payment security verification such as a personal identification number, identifying word or password, answers to questions, and/or voice print recognition;

offering the caller in step 90 the option, using the offering means 72, of paying for the goods or services using a payment engine through which it has previously enrolled so that the caller can pay for the goods or services simply by stating that it has enrolled in the payment processing program and by providing its pre-arranged payment security verification;

if the caller declines in step 92 to use or has not enrolled in the payment processing program, offering the caller the option of paying for the goods or services orally, using the offering means 72, by providing a payment card number, such as a credit card number, and appropriate verification, such as the customer identification numbers for payment cards including credit cards, debit cards, or pre-paid cards;

if the payment is authorized by the payment processor in step 94, converting the caller's vocal order to purchase goods and services to digital format, for example, using the converting means 64, and transmitting the digitally formatted order to a fulfillment facility via SMS, email or a Web Services call. Other known transmission systems and methods may be used to conduct V-commerce using the system 10 and method of the present invention;

sending a message to the purchaser in step 95, for example, an SMS text message to the corresponding telephone 30, 32 associated with the purchaser, for confirming the processing of the payment to complete the transaction; and fulfilling the order for the goods or services in step 96, for example, using the means 71 for fulfilling the order. In an example embodiment, the seller of the goods or services delivers such goods or services to a shipping address, for example, stored in the data vault 41 and associated with the purchaser, which the purchaser had previously entered and stored in the data vault 41. In another embodiment, the buyer may reserve purchased goods online from a store, for example, by telephone, and the buyer can pick-up the goods and pay at the store at the time of pick-up, Other known fulfillment systems and methods may be used to conduct V-commerce using the system 10 and method of the present invention.

Accordingly, the system 10 and method of the present invention operates to perform and complete every step of V-commerce from beginning to end, allowing the user to access a voice store, browse for goods and services, select and purchase goods and services, have the purchase fulfilled, and have the payment for the transaction processed using a payment engine and/or other components, to ensure that the transaction is efficiently and properly conducted and completed using V-commerce through any and all known telephonic devices and systems.

Figure 5:
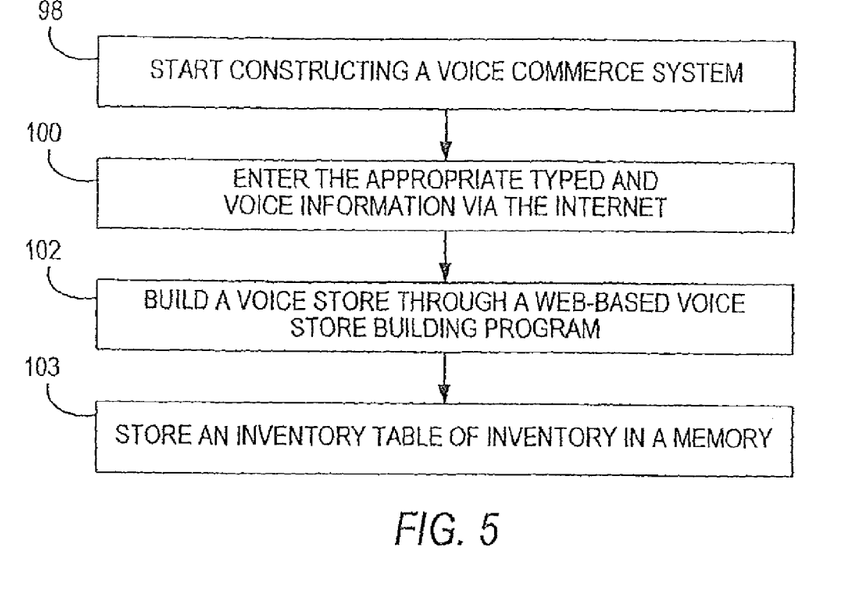
FIG. 5 is a flowchart of a method of constructing a voice commerce system implementing the system and method of FIGS. 1-4B.

In addition, as shown in FIG. 5, the present invention includes a method of constructing a voice commerce system implementing the system 10 and method of FIGS. 1-4B, with the method of constructing including the steps of:

starting construction of a voice commerce system in step 98, for example, by executing the predetermined voice commerce system 42 to provide customizable features;

entering the appropriate typed and voice information in step 100 via the Internet or other known communication systems 18 and any known input devices such as keyboards, voice recognition software, graphic user interfaces (GUIs) with menus and actuatable icons, touch tone entries, etc.;

building a voice store in step 102 through a web-based voice store building program 74; and storing, in step 103, an inventory table of inventory of the voice store in a memory, such as the memory 40, the data vault 41 and/or a specific database 24 associated with the constructed voice store.

The step 100 of entering such typed and/or voice information may include entering personal data including the user's name, date of birth, marital status, etc. as well as payment data such as bank account data, credit card data, or debit card data, and also types of accounts such as checking, savings, debit account status, etc. The personal data and/or the payment data may also including a billing address, a shipping address, and other shipping information for receiving purchases and services such as a preferred method of delivery, including priority mail, specific couriers, or standard freight. Such data may be saved in the memory 40, the data vault 41 and/or a specific database 24 associated with the constructed voice store.

Using the method shown in FIG. 5, the present invention provides a build-your-own-voice-store web application which includes the VUI 48 tailored per store within the speech framework of the present invention, and an inventory database, for example, in the form of an inventory table available in the databases 24 as the memory associated with the voice store for storing the inventory of items by stock number, pricing, and availability, as well as multi-currency services, and the availability of multi-currency services and/or dynamic currency conversion. The web application could also include other functions similar to online stores such as "YAHOO STORES" commercially available from "YAHOO? INC.", such as marketing, sales tax calculation, order management and monitoring capabilities.

Figure 6:
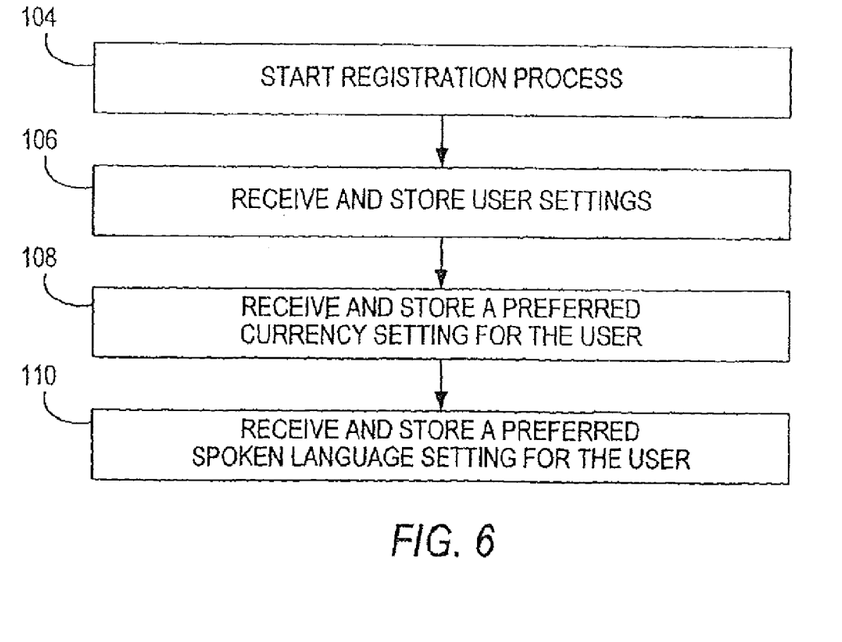
FIG. 6 is a flowchart of a method of registering users and user preferences.

Referring to FIG. 6, the system 10 and method may also include registration of users, including the steps of starting the registration processing in step 104, receiving and storing user settings in step 106, such as passwords of the registered user input through the payment engine 68 to be stored in the memory 40 and/or the data vault 41; receiving and storing a preferred currency setting for the user in step 108, such as the U.S. dollar or the Euro, to be used by the registered user and by the system 10 to conduct V-commerce; and receiving and storing a preferred spoken language setting for the user in step 110, such as English or Spanish, to be used in V-commerce transactions involving the registered user and by the system 10 to conduct V-commerce.

The step 106 of receiving and storing user settings may also include entering personal data including user's name, date of birth, marital status, etc. as well as payment data such as bank account data, credit card data, or debit card data, and also types of accounts such as checking, savings, debit account status, etc. The personal data and/or the payment data may also including a billing address, a shipping address, and other shipping information for receiving purchases and services such as a preferred method of delivery, including priority mail, specific couriers, or standard freight. Such data may be saved in the memory 40 or the data vault 41 in a registration database associated with the constructed voice store.

Using such registration, the caller is provided with the convenience of shopping in a caller-selected currency determined by any known methods, including:

a default currency pre-selected by the caller prior to the shopping transaction;

a currency selected by the caller after prompting the caller to make a choice, with the currency conversion rate determined at a predetermined price point;

a currency selected by the caller after prompting the caller to make a choice, with the currency conversion rate determined from a currency rate feed;

a currency determined, for a non-pre-registered and non-authenticated caller, from the geographic location of the caller at the time of payment. The geographic location can be determined by any known technique, such as using a global positioning system (GPS) to locate a cell phone used by the caller. If, for example, the caller is in London, UK, the system 10 and method sets the caller's currency to be the pounds sterling.

In addition, a default currency can be determined from the country corresponding to the telephone number of the caller registered in the system 10. For example, a caller who registers a telephone number in Japan may automatically be set to use Japanese yen as the default currency of the caller associated with that telephone number.

Such currency settings, determined by any method described herein, can be overridden by the user through the user's telephone.

The shopping component of the speech driven telephone interface provides for at least two potential ways to locate an item to purchase. One method is through a coordinated marketing program which "billboards" a promoted product requesting the consumer to call a designated phone number and potentially speak a key code phrase representative of the product. A second way to locate an item is to use a simple speech driven search capability offering products or services such as Movie Tickets.

Order placement is also speech driven and can accommodate a limited number of speech input parameters such as size and color. Authentication of the shopper is performed during order placement and can comprise of a validated phone number and either an entered personal identification number (PIN) or a pre-determined spoken phrase, as long as they are voice enrolled. The order process requires secure back end integration through a payment system, such as the "PLANET PAYMENT" system commercially available from "PLANET PAYMENT, INC.". Order confirmation is performed orally with an optional email follow-up.

Consumer registration is done with some combination of an Internet-based web interface and a telephone interface. Registration requires information input such as name, address and other identifying data that may be too difficult to do accurately or cost effectively via automatic speech recognition alone at this time, though there are some successful rollouts of this capability for given areas where a database of potential names and streets was built, for example, a Los Angeles utilities company. In the background of the registration process, an entry or import of the credit card or debit card information is accomplished through the system of the present invention.

The system 10 and method of the present invention implement a progressive payment processor and offer a unique leading-edge speech telephony application to banks and other business key partners. The system 10 and method of the present invention use voice technology partners and hosting facilities to develop and run its mobile commerce (m-commerce) application which integrates with known payment systems. The system 10 and method of the present invention may also utilize technology partners to put together a basic working system that integrates with known payment systems and has at least one store.

As described herein, the present invention may be implemented in any known telephone systems, including wired telephones in a plain old telephone system, or just mobile telephones, or hybrid telephone systems with any type of telephone and telephonic device, including PDAs, laptops, pagers, etc. The advantage of accommodating all types of telephone and telephonic devices is that a consumer can shop from any phone.

In addition, the system 10 and method of the present invention is particularly advantageous for facilitating people with limited or no sight for easily conducting V-commerce.

While the preferred embodiment of the present invention has been shown and described herein, it will be obvious that such embodiment is provided by way of example only. Numerous variations, changes and substitutions will occur to those skilled in the art without departing from the invention herein. Accordingly, it is intended that the invention be limited only by the spirit and scope of the appended claims.

The invention claimed is:

1. A telephone-based commerce system for conducting sales transactions involving a selected group of products or services which are advertised for sale at a particular telephone number, said system comprising:
   a voice portal which is assigned the particular telephone number for receiving incoming telephone calls;
   a computer coupled to a memory and having circuitry for selectively communicating with a payment engine which provides pre-enrollment services and with an order fulfillment facility; and
   a voice recognition system communicating with said voice portal and said computer for converting voice signals received from a caller to digital signals which are supplied to said computer, and for converting digital signals received from said computer to voice signals which are transmitted via said voice portal to the caller;
   wherein said computer is programmed, in response to said system receiving an incoming telephone call, to:
   (a) provide digital signals to said voice recognition system, in response to which said voice recognition system generates voice signals to either (i) offer the caller a single product or service associated with such telephone number; or (ii) prompt such caller to select from a limited selection of goods or services associated with such telephone number;
   (b) provide digital signals to said voice recognition system, in response to which said voice recognition system generates voice signals which provide the caller with product and price information associated with an offered product or service;
   (c) provide digital signals to said voice recognition system, in response to which said voice recognition system generates voice signals which prompt such caller to provide identification information;
   (d) in response to receiving digital signals from said voice recognition system corresponding to the voice selection by said caller of one or more goods or services, determining from data stored in a memory account information concerning such caller, including whether such caller has pre-enrolled in a payment processor;
   (e) provide digital signals to said voice recognition system, in response to which said voice recognition system generates voice signals which prompt the caller to elect either to pay through a pre-enrolled payment processor or to pay through an alternate method;
   (f)(i) in the case of a caller who elects to pay using the pre-enrolled payment processor, provide digital signals to said voice recognition system, in response to which said voice recognition system generates voice signals which prompt the caller to provide security verification;
   (ii) in the case of a caller who is not pre-enrolled in a payment processor, or elects to pay through an alternative method, provide digital signals to said voice recognition system, in response to which said voice recognition system generates voice signals which prompt the caller to supply payment information and security verification;

(g) transmit to a payment engine transaction payment information and security verification for a transaction approval; and (h) upon receiving a transaction approval from said payment engine, transmit digital signals to an order fulfillment facility to fill such order, wherein such system permits a caller to select and purchase selected goods or services from any a telephone without the participation of human salespersons.

2. The telephone-based commerce system of claim 1, wherein such system is capable of processing telephone signals from the caller either in the form of voice messages or touch tone signals.

3. The telephone-based commerce system of claim 2, wherein such system is capable of processing any transaction with the caller completely through spoken words.

4. The telephone-based commerce system of claim 1, wherein said computer is further programmed to provide digital signals to said voice recognition system, in response to which said voice recognition system generates voice signals which prompt said caller to select from a plurality of available commerce systems for conducting the transaction.

5. The telephone-based commerce system of claim 1, wherein in steps (a) and (b) of claim 1, said computer is programmed to provide digital signals to said voice recognition system, in response to which said voice recognition system generates voice signals which prompt the caller (i) to browse by voice commands through a description of the products and services being offered and their prices; or (ii) to identify a specific product or service being sought and, in response to the caller selecting such specific product or service, locating information concerning the selected product or service and provide digital signals to said voice recognition system, in response to which said voice recognition system generates voice signals which provide the caller with information concerning the selected product or service.

6. The telephone-based commerce system of claim 5, wherein the computer is programmed to locate a specific product or service using a product code received from the caller as either voice signals or touch tone signals.

7. The telephone-based commerce system of claim 1, wherein the computer is further programmed, in response to said system receiving an incoming telephone call, to provide digital signals to said voice recognition system, in response to which said voice recognition system generates voice signals which prompt the caller to select from a plurality of languages in which to conduct the transaction, and wherein said voice recognition system is capable of supporting such languages.

8. The telephone-based commerce system of claim 1, wherein the computer is further programmed to provide digital signals to said voice recognition system, in response to which said voice recognition system generates voice signals which prompt the caller to select from a plurality of currencies to pay for the purchase.

9. The telephone-based commerce system of claim 8, wherein the computer is further programmed, upon the selection of a currency by the caller, to complete the transaction using dynamic currency conversion.

10. The telephone-based commerce system of claim 8, wherein the computer is further programmed, prior to completion of the transaction, to provide digital signals to said voice recognition system, in response to which said voice recognition system generates voice signals which prompt the caller to complete the transaction in any one of the following ways:

using a default currency pre-selected by the caller prior to the current transaction; or using a currency selected by the caller with the currency conversion rate determined at a predetermined price point; or using a currency selected by the caller with the currency conversion rate determined from a currency rate feed; or in the case of a non-preregistered caller, using the currency from the geographic location of the caller at the time of payment.

* * * * *